United States Patent [19]

Holt

[11] 4,450,361
[45] May 22, 1984

[54] COUPLING OF MHD GENERATOR TO GAS TURBINE

[76] Inventor: James F. Holt, 3795 Osborn Rd., Medway, Ohio 45341

[21] Appl. No.: 411,947

[22] Filed: Aug. 26, 1982

[51] Int. Cl.³ .................... H02N 4/02; H02K 45/00; F02K 5/00
[52] U.S. Cl. ................... 290/1 R; 310/11; 60/202; 60/244; 60/262
[58] Field of Search ............ 290/1 R, 1 A, 1 B, 1 C, 290/1 D, 1 E, 1 F, 2; 310/52, 11; 123/143 R; 60/244, 247, 224, 262, 201, 202; 313/63

[56] References Cited

U.S. PATENT DOCUMENTS

| | | | |
|---|---|---|---|
| 4,085,679 | 4/1978 | Webb et al. | 310/11 X |
| 4,093,879 | 6/1978 | Marchant et al. | 310/11 |
| 4,095,118 | 6/1978 | Rathbun | 290/1 R X |
| 4,107,557 | 8/1978 | Shepherd | 310/11 |
| 4,118,643 | 10/1978 | Coppa et al. | 310/11 |
| 4,128,776 | 12/1978 | Boquist et al. | 310/11 |
| 4,134,034 | 1/1979 | Dardai et al. | 310/11 |
| 4,140,931 | 2/1979 | Marchant et al. | 310/11 |
| 4,151,423 | 4/1979 | Hendel | 310/11 X |
| 4,163,910 | 8/1979 | Matthews et al. | 310/11 |
| 4,180,484 | 12/1979 | Marchant | 310/11 X |
| 4,180,752 | 12/1979 | Gorlin et al. | 310/11 |
| 4,185,213 | 1/1980 | Scannell | 310/11 |
| 4,191,901 | 3/1980 | Branover | 310/11 |
| 4,218,629 | 8/1980 | Kayukawa et al. | 310/11 |
| 4,229,322 | 10/1980 | Marchant et al. | 310/11 X |
| 4,230,959 | 10/1980 | Spurrier | 310/11 |
| 4,239,996 | 12/1980 | Bhada et al. | 310/11 |
| 4,243,645 | 1/1981 | Lahoda | 310/11 X |
| 4,260,913 | 4/1981 | Bitjurin et al. | 310/11 |
| 4,268,765 | 5/1981 | Hoover, Jr. | 310/11 |
| 4,269,637 | 5/1981 | Flanagan | 310/11 X |
| 4,274,019 | 6/1981 | Aladiev et al. | 310/11 |
| 4,275,318 | 6/1981 | Duncan | 310/11 |
| 4,278,906 | 7/1981 | Kullmann | 310/52 |
| 4,287,443 | 9/1981 | Aladiev et al. | 310/11 |
| 4,290,189 | 9/1981 | Coppa | 310/11 X |
| 4,292,209 | 9/1981 | Marchant et al. | 310/11 X |
| 4,301,375 | 11/1981 | Anderson | 290/1 R |
| 4,343,272 | 8/1982 | Buck | 123/143 R X |
| 4,346,302 | 8/1982 | Bozzuto | 290/1 R |
| 4,367,413 | 1/1983 | Nair | 310/52 X |

FOREIGN PATENT DOCUMENTS

| | | | |
|---|---|---|---|
| 57-20145 | 2/1982 | Japan | 310/52 |
| 363098 | 8/1962 | Switzerland | 290/1 R |

*Primary Examiner*—J. V. Truhe
*Assistant Examiner*—Terry Flower
*Attorney, Agent, or Firm*—Donald J. Singer; Bobby D. Scearce

[57] ABSTRACT

An improved power plant incorporating a gas turbine and a magnetohydrodynamic (MHD) generating means is provided wherein a plurality of coolant conducting fins are disposed in the diffuser region of the duct between the MHD generator and the turbine. The cooling fins are provided with means to supply compressed coolant to the diffuser duct for mixing with the combustion gases to provide optimum gas pressure, temperature and velocity for driving the turbine.

5 Claims, 4 Drawing Figures

COUPLING OF MHD GENERATOR TO GAS TURBINE

RIGHTS OF THE GOVERNMENT

The invention described herein may be manufactured and used by or for the Government of the United States for all governmental purposes without the payment of any royalty.

BACKGROUND OF THE INVENTION

This invention relates generally to power plants having gas driven turbine engines and more specifically to a power plant incorporating both a gas driven turbine and a magnetohydrodynamic (MHD) generating system.

Magnetohydrodynamic (MHD) power generating systems have found substantial prior use in supplementing other power plant operation, particularly jet engines or the like whose operation is characterized by the generation of hot gases suitable to achieve MHD interactions, and by reason of the fact that MHD power generation does not require the use of moving parts which are adversely affected by exposure to the high temperature of the gases.

In the incorporation of a combustion MHD generator into a power plant, it would be desirable to locate the generator near and upstream of a gas turbo-electric generator in order to make optimum use of the combustion gases to provide for electrical power generation. However, a turbine incorporated into the engine plant and configured to be driven by the flow of the combustion gases must, for feasible operation, be supplied with a lower temperature gaseous flow than that which is characteristic of the exhaust of the MHD generator. The present invention solves this problem by providing means, between an MHD generator and a gas turbine, to cool and supplement the MHD exhaust to provide suitable gas temperature, pressure and velocity to efficiently drive the turbine, and at the same time to obtain greater overall energy conversion efficiency for the two systems (MHD and gas turbine) than that for each system used separately.

According to the present invention, a set of cooling and mixing fins are introduced as a coupling means between an MHD generator and the turbine section of a power plant incorporating a gas turbine engine. The cooling fins are disposed in the diffuser section of the engine duct between the MHD generator and the turbine, and are configured to supply cool compressed gas, vapor, or liquid for mixing with the combustion gases exiting that region of the duct adjacent the MHD generator. The effect of the fins is to lower the temperature of gases entering the turbine so that the turbine blades and other affected engine parts may operate at a temperature lower than the temperature of the MHD exit gas, and to raise the pressure of gases entering the turbine to a level at which the turbine will operate a reasonable efficiency. The overall result of the introduction of the cooling/mixing fins of the present invention is that by combining, for example, an MHD generator of about 20% thermal efficiency with a gas turbine generator of about 40% turbo-electric efficiency, the overall energy conversion efficiency of the system may be about 50%. Some energy is lost in the coupling process, since coolant is pumped through the fins. However, by combining the MHD generator and turbine in a system coupled according to the invention described herein, no additional machine volume per unit energy produced is required, the weight per energy unit produced by the coupled system is therefore reduced, and fuel efficiency of the power plant is significantly improved.

It is, therefore, an object of the present invention to provide an improved gas turbine power plant.

It is another object of the present invention to provide high efficiency coupling means between the turbine of a gas turbine power plant and an MHD generator incorporated therein.

It is a further object of the present invention to provide a high efficiency, relatively low temperature operation, gas turbine.

These and other objects of the present invention will become apparent as the detailed description of certain representative embodiments thereof proceeds.

SUMMARY OF THE INVENTION

In accordance with the foregoing principles and objects of the present invention, an improved power plant incorporating a gas turbine and a magnetohydrodynamic (MHD) generating means is provided wherein a plurality of coolant conducting fins are disposed in the diffuser region of the duct between the MHD generator and the turbine. The cooling fins are provided with means to supply compressed coolant to the diffuser duct for mixing with the combustion gases to provide optimum gas pressure, temperature and velocity for driving the turbine.

DESCRIPTION OF THE DRAWINGS

The present invention will be more clearly understood from the following detailed description of specific representative embodiments thereof read in conjunction with the accompanying drawings wherein.

DETAILED DESCRIPTION

Figure 1:
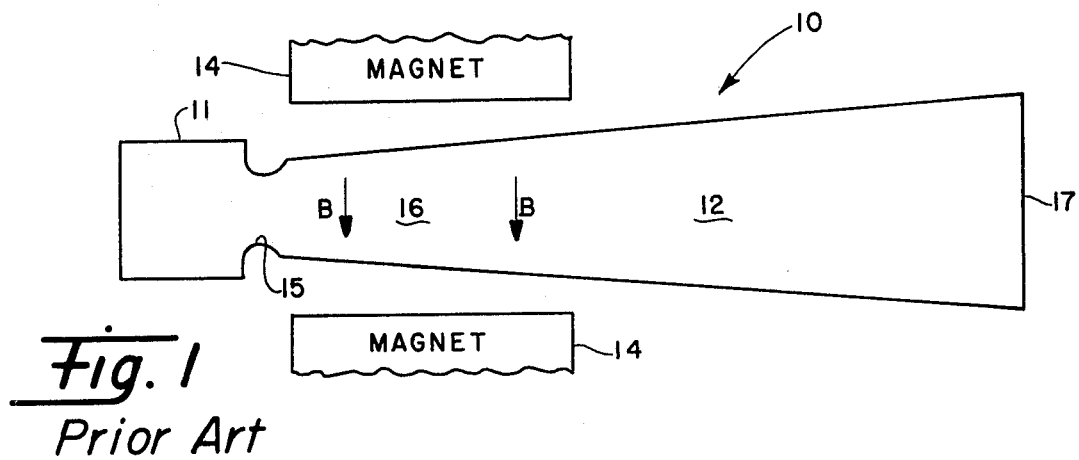
FIG. 1 is a schematic axial section of a conventional open cycle combustion driven MHD generator.

Referring now to the drawings, FIG. 1 is a schematic axial section of a typical conventional open cycle MHD generator 10. The major components of MHD generator 10 may be that represented schematically as combustor 11, diffuser chamber 12, and MHD channel 16. The MHD generator 10, all components of which are not shown in detail in the drawings, includes a magnet 14, which is disposed adjacent that portion of MHD channel 16 immediately downstream of expansion nozzle 15 through which combustion gases exhaust from combustor 11. Fuel is burned in the combustor 11 and produces high pressure combustion gases. The combustion gases expand as they pass nozzle 15 and into MHD channel 16 comprising that portion of the gas flow train affected by the magnetic field B established by magnet 14 of the MHD generator 10. The combustion gases are typically seeded with an alkali such as $K_2CO_3$, $Cs_2CO_3$, KOH, CsOH, added into combustor 11 by means not shown in the drawings.

In the MHD channel 16, the combustion gases move at supersonic or near sonic speed, and are characterized by temperatures of from about 2000 C. to about 2800 C. Electric current, generated by the interaction of the moving gases and the magnetic field B within MHD channel 16, may be extracted through conventional means (not shown) into an electrical load. The combustion gases then pass into diffuser chamber 12 where they are slowed to subsonic speed, and are exhausted through the exhaust 17 end of MHD generator 10.

Figure 3:
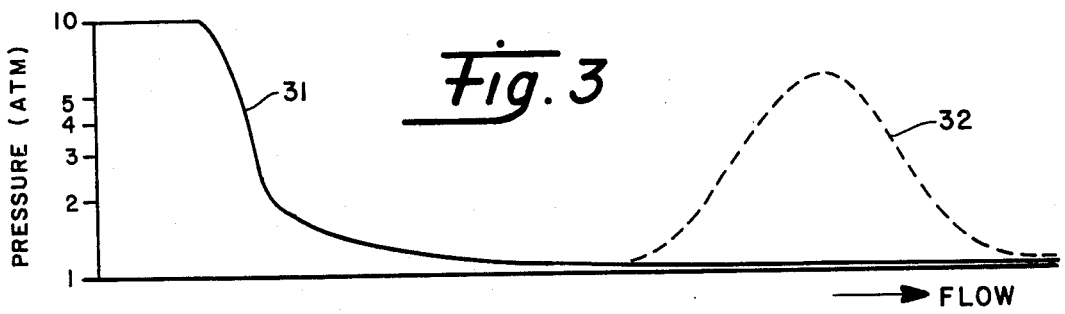
FIG. 3 is a graphic illustration of the pressure profiles for combustion gases within the power plants of FIG. 1 and FIG. 2.

Referring now additionally to FIG. 3, shown therein and labeled curve 31, is the pressure profile for the combustion gases along the flow direction of MHD generator 10 from combustor 11 to exhaust 17. As shown by curve 31 of FIG. 3, the pressure of the combustion gases typically may be at about 10 atmospheres within combustor 11 and near nozzle 15, but decreases rapidly to typically about one to two atmospheres as the gases flow through MHD channel 16 and diffuser 12.

As discussed above in the "Background of the Invention", the combustion gases passing through exhaust 17 of the MHD generator 10 configuration presented in FIG. 1 may be at an undesirably high temperature for entering a turbine (e.g., at about 2000 to 2800 C.) and at an undesirably low pressure (about one to two atmospheres) to drive a turbine without severe thermal damage to the materials comprising the turbine.

Figure 2:
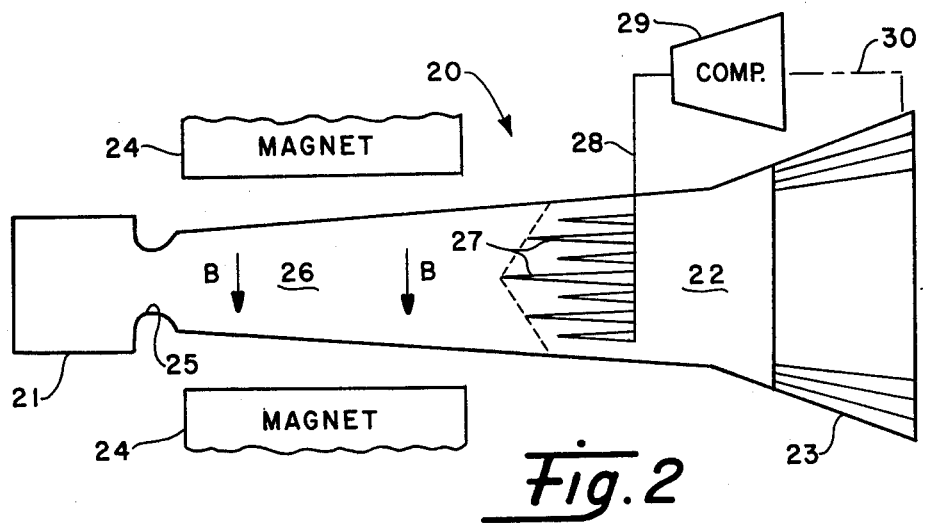
FIG. 2 is a schematic axial section of a power plant including a gas turbine engine and an MHD generator, incorporating the novel coupling means of this invention.
Figure 4:
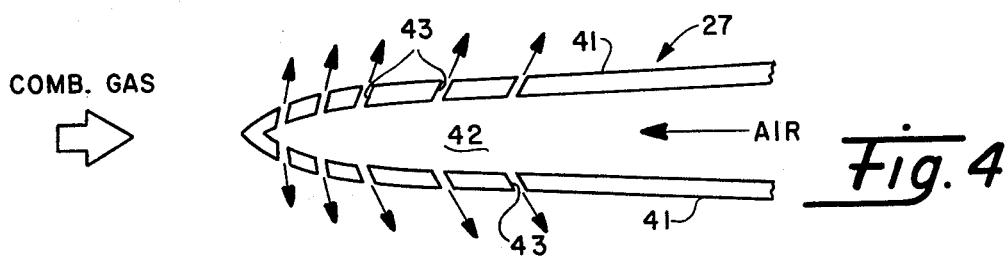
FIG. 4 is a cross-sectional view of a representative cooling/mixing fin of the present invention.

Referring now to FIG. 2, an engine 20 is configured to include an MHD generator and gas turbine according to the present invention and which operates at desirable combustion gas temperature, pressure and velocity levels in order to drive the turbine efficiently and without thermal damage. As shown in FIG. 2, the engine 20 may comprise constituent parts shown schematically as including a source of high temperature gaseous propellant such as combustor 21, and magnets 24, MHD channel 26, nozzle 25, and turbine 23. Unconventional diffuser chamber 22 of engine 20 of FIG. 2 couples MHD channel 26 to turbine 23 through a segment thereof containing a plurality of spaced, hollow cooling fins 27 through which compressed coolant such as air, hydrogen, liquid hydrogen, or water, may be supplied to the diffuser 22 region of engine 20. A schematic cross-section of a representative fin 27 is shown in FIG. 4, and may comprise a pair of converging wall elements 41 defining a central channel 42 through which coolant may flow substantially as illustrated in FIG. 4. Each fin 27 may contain a plurality of orifices 43 through which high pressure coolant may be pumped as shown by the arrows indicating flow from each orifice 43, for thorough mixing with combustion gases exiting MHD channel 26.

Each cooling fin 27 shown in FIG. 2 is supplied with high pressure (about 10 atm.) coolant from a source through means such as line 28 and compressor 29. Compressor 29 may be operatively interconnected with and driven by turbine 23 through conventional electrical or mechanical means 30 (not shown in detail in FIG. 2). The plurality of fins 27 are spaced radially within diffuser chamber 22 to assure thorough mixing of coolant with the combustion gases exiting MHD channel 26. Further, certain of the fins 27 may be displaced axially as suggested in FIG. 2 to distribute the shock waves resulting from the collision of the combustion gas flow with fins 27 over some desirable axial distance within diffuser chamber 22. The static pressure of the gases in the coupling (mixing) region occupied by fins 27 is thereby increased to a value more suitable than the exhaust gas of the MHD generator for efficiently driving turbine 23. The altered pressure profile in the diffuser 22-turbine 23 region of engine 20 may now be represented by the dotted curve 32 of FIG. 3 wherein the pressure downstream of the fins 27 has been increased to about six to eight atm. and peaks near the upstream side of turbine 23. Simultaneously in the diffuser 22 region, the velocity of the gaseous stream has been decreased to a value substantially subsonic and the temperature has been decreased to a level precluding overheating of the turbine blades.

Cooling fins 27 may assume a variety of structural configurations, within the intended scope of the invention herein, including conical, cylindrical, planer, or the like. Additionally the fins 27 may be spacially arranged in any desirable fashion, such as a honeycomb or radial design, and interconnected to provide structural integrity to the assembly. Materials of construction for the fins 27 may be selected to be compatible with the combustion gases and to withstand the temperature and pressure characterizing engine 20 operation.

The present invention, as hereinabove described, therefore provides an improved gas turbine power plant. It is understood that certain modifications to the invention as herein described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:
1. An improved power plant comprising:
   a. means providing a source of high temperature gaseous flow;
   b. a rotary turbine driven by said gaseous flow;
   c. means defining a duct for conducting said gaseous flow from said source to said turbine;
   d. a magnetohydrodynamic generator adjacent said duct and intermediate said source and said turbine, said generator interacting with said gaseous flow to generate electrical power; and
   e. a plurality of cooling fins disposed within said duct intermediate said generator and said turbine for cooling said gaseous flow.

2. The power plant as recited in claim 1, further comprising:
   a. means defining a channel through each said fin and defining an inlet and outlet therefor for conducting coolant therethrough; and
   b. means, connected to each said inlet, for supplying coolant to said duct through said fins for mixing with said gaseous flow entering said turbine.

3. The power plant as recited in claim 2 wherein said coolant supply means includes a compressor and conduit means interconnecting said compressor with each said inlet.

4. The power plant as recited in claim 2 wherein the flow of coolant through said fins is directed counter the gaseous flow through said duct whereby substantial mixing of said coolant with said gaseous flow is achieved.

5. The power plant as recited in claim 2 wherein the coolant is selected from a group consisting of air, hydrogen, and water.

* * * * *